(12) United States Patent
Kuronuma et al.

(10) Patent No.: US 7,359,077 B2
(45) Date of Patent: Apr. 15, 2008

(54) PRINTING APPARATUS, CONTROL METHOD THEREFOR, AND PROGRAM

(75) Inventors: Akira Kuronuma, Tokyo (JP); Masafumi Wataya, Kanagawa (JP); Toru Nakayama, Kanagawa (JP); Takuji Katsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 975 days.

(21) Appl. No.: 10/420,728

(22) Filed: Apr. 23, 2003

(65) Prior Publication Data
US 2003/0202205 A1 Oct. 30, 2003

(30) Foreign Application Priority Data
Apr. 24, 2002 (JP) ............................. 2002-122602
Apr. 3, 2003 (JP) ............................. 2003-100636

(51) Int. Cl.
*G06F 15/00* (2006.01)
*G06K 1/00* (2006.01)

(52) U.S. Cl. .................... 358/1.15; 358/1.17; 358/1.9; 710/24; 710/22; 347/3

(58) Field of Classification Search ................. 358/1.9, 358/1.1, 1.14, 1.15, 1.16, 1.17, 468; 347/5, 347/3; 710/22, 24, 113
See application file for complete search history.

(56) References Cited

U.S. PATENT DOCUMENTS 5,461,701 A * 10/1995 Voth .......................... 358/1.1
5,581,669 A * 12/1996 Voth .......................... 358/1.14
5,630,029 A * 5/1997 Kosukegawa ............... 358/1.15
5,850,570 A * 12/1998 Shoji ........................... 710/24
5,877,782 A * 3/1999 Imai et al. ..................... 347/3
5,930,464 A * 7/1999 Nakayama et al. ........ 358/1.15
5,978,866 A * 11/1999 Nain ............................ 710/22
6,068,359 A * 5/2000 Inose et al. ..................... 347/5
6,097,499 A * 8/2000 Casey et al. ............... 358/1.16
6,122,699 A 9/2000 Omo et al. .................. 710/131
6,243,778 B1 * 6/2001 Fung et al. ................. 710/113
6,426,805 B1 * 7/2002 Imai et al. .................. 358/468
6,483,604 B1 * 11/2002 Gerstenberger ............ 358/1.17
6,952,276 B2 * 10/2005 Sotokawa et al. ......... 358/1.15
6,967,743 B1 * 11/2005 Kumazawa ................. 358/1.9
7,271,927 B2 * 9/2007 Kobayashi ................. 358/1.15

FOREIGN PATENT DOCUMENTS

JP 10-333856 12/1998

* cited by examiner

*Primary Examiner*—Thomas D. Lee
*Assistant Examiner*—Satwant Singh
(74) *Attorney, Agent, or Firm*—Fitzpatrick, Cella, Harper & Scinto

(57) ABSTRACT

A CPU monitors the state of a printing apparatus, and controls transmission, to the host, of a control signal for controlling the data reception timing from the host.

7 Claims, 7 Drawing Sheets

PRINTING APPARATUS, CONTROL METHOD THEREFOR, AND PROGRAM

FIELD OF THE INVENTION

The present invention relates to a printing apparatus which performs printing on the basis of data received from a host, a control method therefor, and a program.

BACKGROUND OF THE INVENTION

Recently, a universal serial bus (so-called USB) has widely been spread as an interface between a host computer (to be referred to as a host hereinafter) and a printing apparatus called a printer.

USB transfer modes include several types. Data transfer between a host and a printer generally utilizes a bulk transfer mode. In bulk transfer, the host transfers data for each packet having a specific number of bytes. The printer sends back a signal ACK if correctly receiving the transferred packet, or a signal NACK if failing to receive any packet due to some reason.

The host transmits the next data if receiving a signal ACK, or the same data to the printer again if receiving an NACK signal.

Independently of this operation, the host transmits to the printer a status response request which requests the printer to send the current printer status. Upon reception of this status response request, the printer sends back the current printer status such as a normal state or error occurrence. In general, the status request sequence is executed at a predetermined time interval.

The printer cannot receive data when the reception buffer in the printer becomes full. The reception buffer becomes full in, e.g., a case wherein long-time head cleaning is performed, a case wherein a cooling period is required due to excessive temperature rise of the printhead, a case wherein printing cannot be done in the absence of any sheet or ink in the printer, and a case wherein printing cannot be done due to a sheet jam in the printer.

Of these cases, two former cases are free from any error, and print processing can continue again after the end of processing. In two latter cases, however, an error occurs, and the user must do some processing.

A host which incorporates a recent Windows OS displays a time-out error dialog for a long NACK signal return period.

As described above, conditions for a long NACK signal return period include cleaning processing free from any error.

In the conventional control method, conditions for a long NACK signal return period include cleaning processing free from any error. Even in such a case, if the user recognizes the time-out error dialog on the host, he/she may cancel printing.

To avoid this, it must be prevented to generate the dialog by the host until the host grasps the state of a peripheral device, and to prolong the continuous NACK signal return period.

A serial interface such as an RS-232C interface other than a USB interface has a status signal for monitoring the operation status of a device by using a signal DTR, as disclosed in Japanese Patent Laid-Open No. 10-333856. The USB interface does not have such status signal.

Basic circuits for USB interface circuits have been developed by a plurality of vendors (inSilicon, NEC, and the like). Designers for printing apparatuses design the circuits of printing apparatuses by building in interface circuit macros. However, the USB interface circuit does not have a function of building in a macro a status signal like one prepared for the RS-232C interface. In addition, any change in USB interface circuit is forbidden.

SUMMARY OF THE INVENTION

The present invention has been made to overcome the conventional drawbacks, and has as its object to provide a printing apparatus which can prevent any time-out in a host without changing the apparatus arrangement and efficiently control data reception of the apparatus, a control method therefor, and a program.

According to the present invention, the foregoing object is attained by providing a printing apparatus which performs printing on the basis of data received from a host, comprising: interface means for receiving data from the host; transfer means for transferring the received data from the interface means to a reception buffer; determination means for determining a state of the printing apparatus; and control means for delaying a transfer timing of the transfer means on the basis of a determination result of the determination means and controlling transmission, to the host, of a control signal for controlling a data reception timing from the host.

In a preferred embodiment, the control means outputs a response signal to the host within a time shorter than a data transfer time-out time set by the host for the printing apparatus.

In a preferred embodiment, the transfer means includes a DMA request signal generation circuit and a DMA request arbitration circuit which transfer data to the reception buffer by DMA transfer.

In a preferred embodiment, the transfer timing of the transfer means is delayed by delaying an output timing of a control signal output from the DMA request signal generation circuit.

In a preferred embodiment, the DMA request arbitration circuit receives DMA request signals from a plurality of DMA request signal generation circuits, and executes arbitration processing of the received DMA request signals.

In a preferred embodiment, the determination means determines as the state of the printing apparatus whether or not maintenance operation is occurred in the printing apparatus.

In a preferred embodiment, the determination means determines as the state of the printing apparatus whether a free space of the reception buffer in the printing apparatus is not more than a predetermined value.

According to the present invention, the foregoing object is attained by providing a method of controlling a printing apparatus which performs printing on the basis of data received from a host, comprising: a transfer step of transferring received data to a reception buffer from an interface for receiving data from the host; a determination step of determining a state of the printing apparatus; and a control step of delaying a transfer timing in the transfer step on the basis of a determination result in the determination step and controlling transmission, to the host, of a control signal for controlling a data reception timing from the host.

In a preferred embodiment, a program which realizes control of a printing apparatus that performs printing on the basis of data received from a host, comprising: a program code for a transfer step of transferring received data to a reception buffer from an interface for receiving data from the host; a program code for a determination step of determining a state of the printing apparatus; and a program code for a control step of delaying a transfer timing in the transfer step on the basis of a determination result in the determination step and controlling transmission, to the host, of a control signal for controlling a data reception timing from the host.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described in detail below with reference to the accompanying drawings.

First Embodiment

Figure 1:
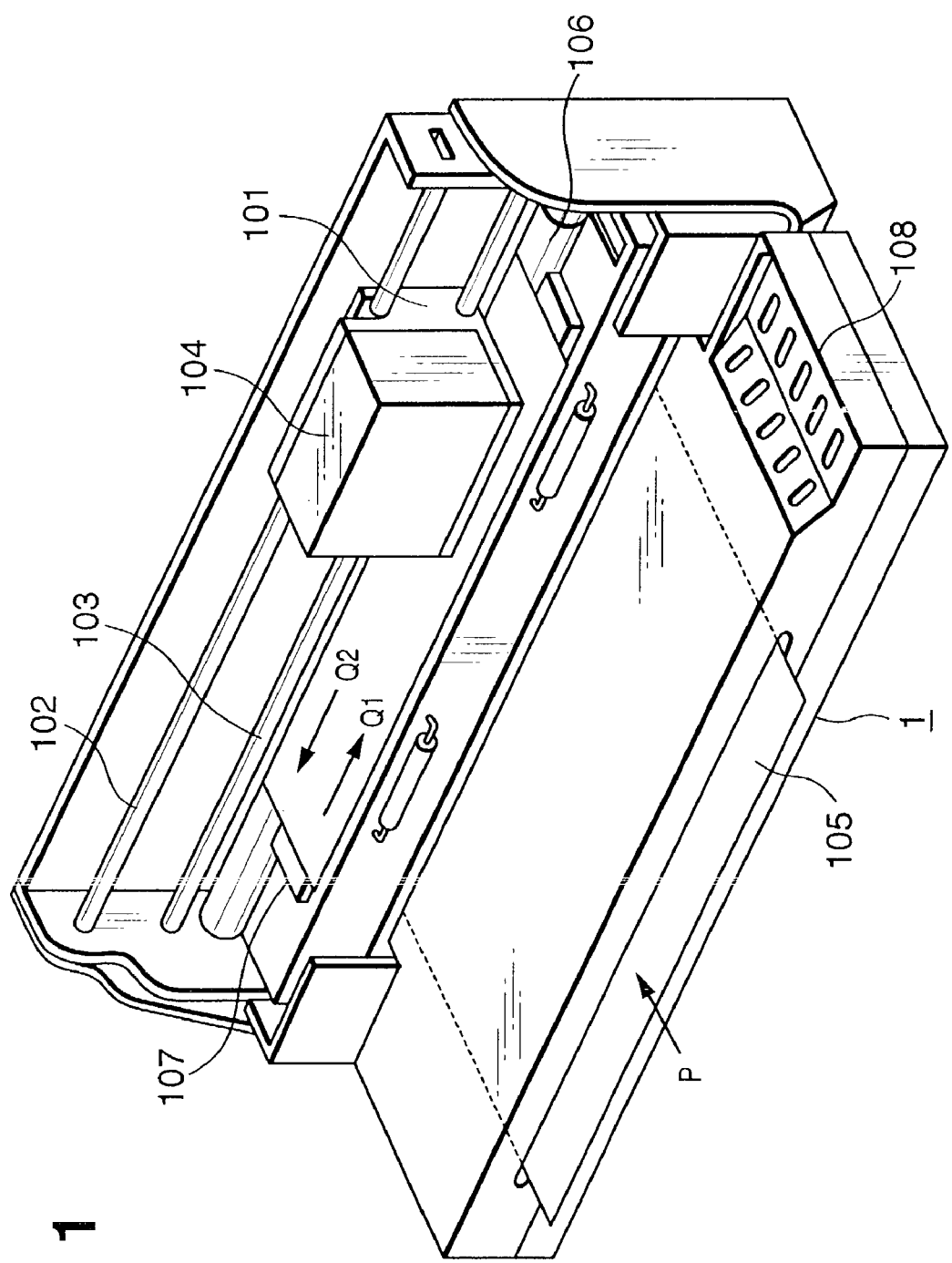
FIG. 1 is a perspective view showing the schematic arrangement of an inkjet printing apparatus to which the present invention can be applied.

FIG. 1 is a perspective view showing the schematic arrangement of an inkjet printing apparatus to which the present invention can be applied.

The inkjet printer can perform both color printing and monochrome printing. For a monochrome printing apparatus, the printhead is equipped with only nozzles for discharging black ink (to be described later).

A printing medium 105 inserted into the sheet feed position of a printing apparatus 1 is fed by a feed roller 106 in a direction indicated by an arrow P, and conveyed to the printable region of a printhead 104. A platen 107 is arranged below the printing medium 105 in the printable region. A carriage 101 can be moved by two guide shafts 102 and 103 along them. The carriage 101 is reciprocally scanned by driving of a DC motor (not shown) within a scanning region including a printing region in directions indicated by arrows Q1 and Q2 serving as a main scanning direction. After one main scanning ends, the printing medium is fed by a predetermined amount in the sub-scanning direction indicated by the arrow P, and waits for the next main scanning. Main scanning and sub-scanning are repeated to perform printing operation of one page.

As for a printing width in the main scanning direction, a region where the printhead 104 can be mechanically scanned is determined by the apparatus design. The maximum printing width is determined depending on the apparatus in correspondence with the scanning region. Printing can be done for a printing medium 105 having a printing width determined by the scanning region of the printhead 104 or a printing medium 105 having a smaller printing width in the printing apparatus.

In FIG. 1, the printhead 104 mounted on the carriage 101 includes orifices (printing elements) capable of discharging ink, and an ink tank which contains ink. The printhead 104 is mounted on the carriage 101 such that printing is done by discharging ink from the orifice of the printhead 104 to the printing medium 105 below it.

Reference numeral 108 denotes an operation panel including switches and a display. The switches are used to power on/off the printing apparatus 1 or set various printing modes. The display can display various statuses of the printing apparatus 1.

The printhead 104 can print data in four colors: yellow (Y), magenta (M), cyan (C), and black (Bk). The number of orifices for each of Y, M, and C is 128, and the number of orifices for Bk is 320. The layout pitch between orifices for each color is $\frac{1}{600}$ inch in the sub-scanning direction, which corresponds to about 42 μm. The driving frequency of the printhead 104 is generally 15 kHz, and the printhead 104 can perform printing operation at a density of 600 dpi in the main scanning direction. The main scanning speed of the carriage 101 in printing operation is generally 25 inches/sec.

A linear encoder (not shown) with a slit at a cycle of 600 dpi is arranged on the back side of the carriage 101. A mechanical controller 404 (FIG. 3) operates the carriage motor of a mechanical unit 405, reciprocating the carriage 101 in the main scanning direction (directions indicated by Q1 and Q2 in FIG. 1).

The carriage motor which drives the carriage 101 is, e.g., a DC motor. In general printing operation, the position or moving speed of the carriage 101 is detected by an optical sensor on the back side of the carriage 101 by using the linear encoder. The scanning speed of the carriage 101 is kept constant under DC servo control.

Figure 2:
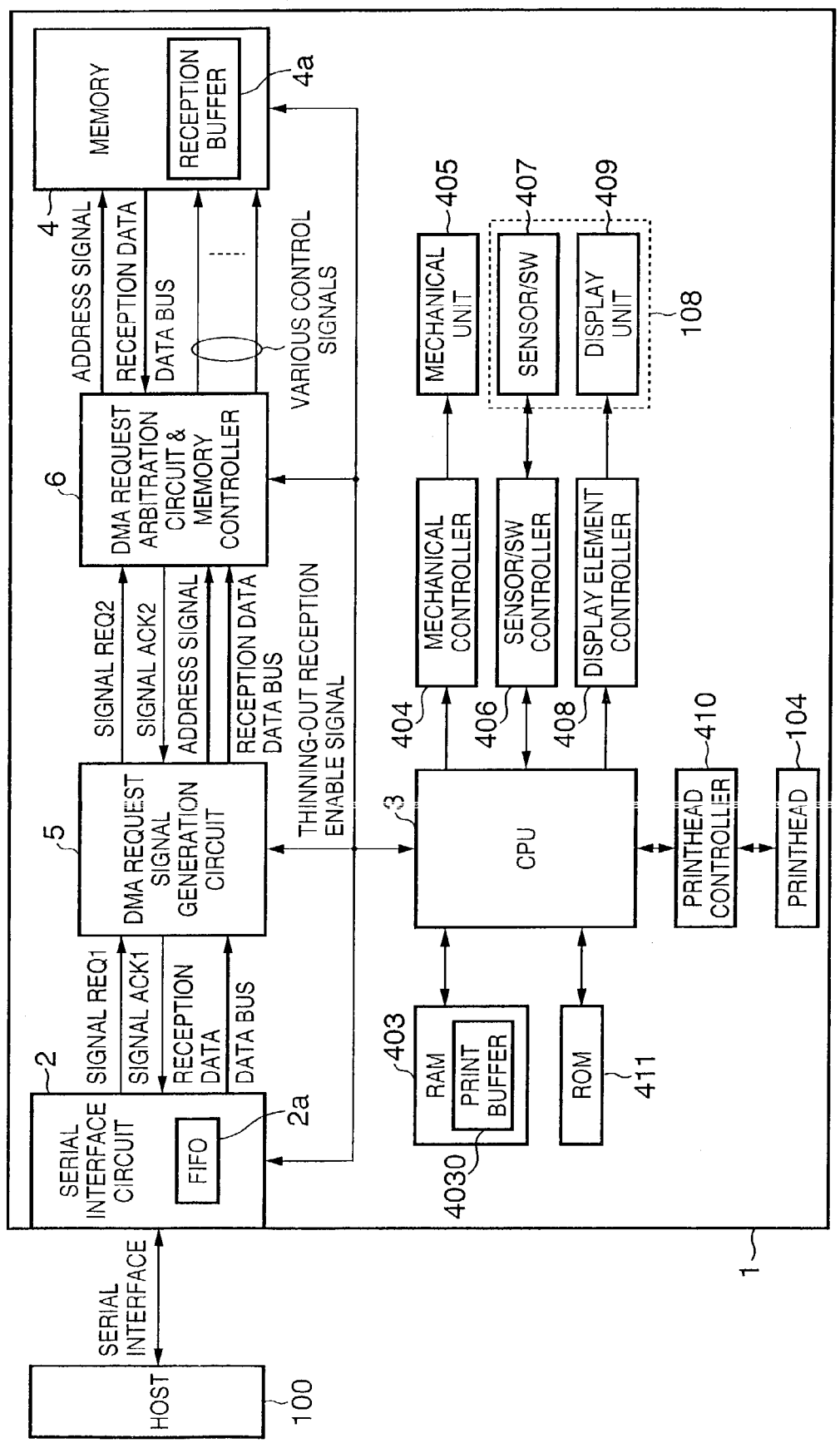
FIG. 2 is a block diagram showing the main arrangement of a printing system according to the first embodiment of the present invention.

FIG. 2 is a block diagram showing the main arrangement of a printing system according to the first embodiment of the present invention.

In the printing apparatus 1, reference numeral 2 denotes a serial interface circuit which converts serial data received from a host 100 into parallel data and stores the parallel data in a FIFO 2a. The serial interface circuit 2 transmits a signal REQ1 to a DMA request signal generation circuit 5, and transmits reception data in the FIFO 2a to the DMA request signal generation circuit 5 via a data bus. After that, the serial interface circuit 2 receives a signal ACK1 in response to the signal REQ1 from the DMA request signal generation circuit 5. The serial interface circuit 2 is a built-in interface macro. The FIFO 2a has, e.g., two 64-byte buffers, and stores print data sent from the host 100. From these buffers, 1-byte data are sequentially transmitted to the DMA request signal generation circuit 5. The serial interface circuit 2 is a commercially available macro.

The DMA request signal generation circuit 5 receives the signal REQ1 from the serial interface circuit 2, and then receives reception data via the data bus. The DMA request signal generation circuit 5 transmits the signal ACK1 in response to the signal REQ1 on the basis of a thinning-out reception enable signal received from a CPU 3. The DMA request signal generation circuit 5 transmits a signal REQ2 to a DMA request arbitration circuit & memory controller 6, and transmits reception data from the serial interface circuit 2 to the DMA request arbitration circuit & memory controller 6 via the data bus together with an address signal. Thereafter, the DMA request signal generation circuit 5 receives a signal ACK2 in response to the signal REQ2 from the DMA request arbitration circuit & memory controller 6.

The DMA request arbitration circuit & memory controller 6 manages the memory control of a memory 4. The DMA request arbitration circuit & memory controller 6 transmits reception data corresponding to an address signal received from the DMA request signal generation circuit 5 to the memory 4 via the data bus. The DMA request arbitration circuit & memory controller 6 also transmits various control signals to the memory 4 in addition to an address signal and reception data.

The memory 4 has a reception buffer 4a which stores reception data received from the DMA request arbitration circuit & memory controller 6. Reception data is stored in the reception buffer 4a at an address position represented by a received address signal. The reception buffer 4a has, e.g., a 64-kbyte size.

Print data stored in the reception buffer 4a is processed into data for printing in main scanning of the printhead 104 under the management of the CPU 3. The resultant data is stored in a print buffer 4030 within a random access memory (RAM) 403. The print buffer 4030 stores data used for printing by the printhead 104. Data stored in the print buffer 4030 is transferred to the printhead 104, and then printing is executed. In the example shown in FIG. 2, an area for the print buffer 4030 is ensured in the memory area of the RAM 403.

Data in the print buffer 4030 is transferred to the printhead 104 by a printhead controller 410. The printhead 104 is controlled to print character data or image data. The printhead controller 410 detects temperature information or the like representing the state of the printhead 104, and sends the information to the CPU 3. The information is transmitted to the printhead controller 410 which controls driving of the printhead 104.

The mechanical controller 404 drives and controls the mechanical unit 405 such as a carriage motor or line feed motor in response to an instruction from the CPU 3.

A sensor/SW controller 406 transmits a signal to the CPU 3 from a sensor/SW 407 including various sensors and SW (switch).

A display element controller 408 controls a display unit 409 comprised of LEDs, liquid crystal display elements, and the like for display panels in response to an instruction from the CPU 3.

A ROM 411 stores data such as various control programs and various setting data for executing various control operations of the printing apparatus 1. The CPU 3 appropriately loads various control programs and various setting data into the RAM 403, and executes them, thereby executing various control operations of the printing apparatus 1.

Note that an interface which connects the host 100 and printing apparatus 1 is, e.g., a USB interface. However, the present invention is not limited to this. The host 100 and printing apparatus 1 may be connected using another interface such as IEEE 1394, IrDA, or Bluetooth as long as the interface adopts signals ACK and NACK. There is also available another interface which can also transfer data by connecting the host 100 and printing apparatus 1 by wire or wirelessly. In addition, both the host 100 and printing apparatus 1 may incorporate network interfaces to realize data transfer via a network such as an Ethernet.

The host 100 is implemented by a general-purpose computer such as a personal computer or workstation. The host 100 has standard building components mounted in a general-purpose computer (e.g., a CPU, RAM, ROM, hard disk, external memory, network interface, display, keyboard, and mouse). The building components are not limited to them, and any building components can be adopted as long as they realize the present invention. The building components shown in FIG. 1 may be realized by executing by the CPU a program stored in the internal ROM of the host 100 or an external memory, or realized by dedicated hardware.

Figure 3:
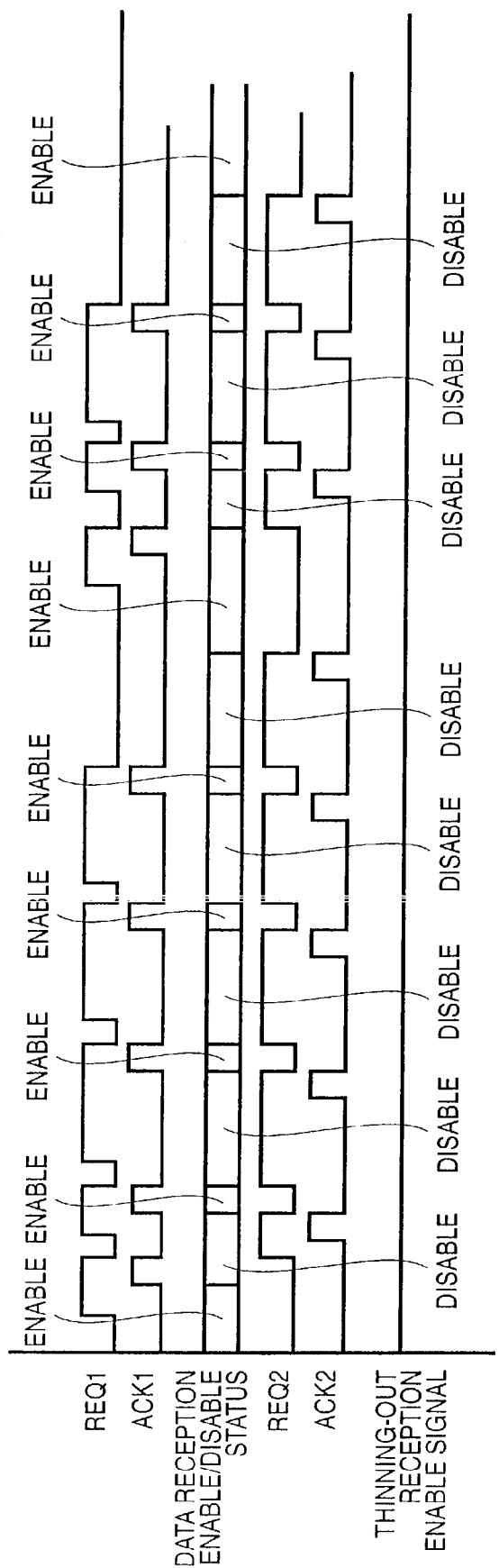
FIG. 3 is a timing chart showing the operations of main signals in the printing system according to the first embodiment of the present invention.

FIG. 3 is a timing chart showing the operations of main signals in the printing system according to the first embodiment of the present invention.

Normal data transfer between the host 100 and the printing apparatus 1 will be explained.

Serial data output from the host 100 is serial/parallel-converted by the serial interface circuit 2 of the printing apparatus 1, and stored in the FIFO buffer 2a of the serial interface circuit 2.

If the serial interface circuit 2 changes to a data transfer start enable state, data transfer to the DMA request signal generation circuit 5 starts. This data transfer is started by handshaking using signals REQ and ACK. More specifically, a signal REQ1 is enabled after effective reception data is set in the data bus.

The DMA request signal generation circuit 5 receives the signal REQ1 from the serial interface circuit 2. If the DMA request signal generation circuit 5 is in a data receivable state, it internally latches data on the data bus, and sends back a signal ACK1 to the serial interface circuit 2.

By repeating these procedures, the serial interface circuit 2 sequentially transfers data to the DMA request signal generation circuit 5.

The DMA request signal generation circuit 5 controls to write data in the reception buffer 4a incorporated in the memory 4 of the printing apparatus 1. This data transfer is also started by handshaking using signals REQ and ACK. More specifically, the DMA request signal generation circuit 5 sets received data in the data bus, sets internally generated address data in the address bus, and then enables a signal REQ2.

The DMA request arbitration circuit & memory controller 6 receives the signal REQ2 from the DMA transfer request signal generation circuit 5. After the DMA request arbitration circuit & memory controller 6 arbitrates the signal REQ2 and another signal REQ from another DMA request block, and DMA processing by the signal REQ2 becomes possible, the circuit 6 sends back a signal ACK2 to the DMA transfer request signal generation circuit 5. At the same time, the DMA request arbitration circuit & memory controller 6 performs actual write operation in the memory 4.

By the above-described procedures, data is written in the reception buffer 4a of the memory 4 from the serial interface circuit 2 via the DMA request arbitration circuit & memory controller 6.

Operation when the CPU 3 enables a thinning-out reception enable signal will be explained.

The CPU 3 of the printing apparatus 1 monitors the state of the printing apparatus 1. When the printing apparatus 1 is in a predetermined state, e.g., during maintenance (e.g., during cleaning operation of the printhead 104, during cooling operation in response to temperature rise of the printhead 104, or during supply operation of a printing agent (ink)), the thinning-out reception enable signal is output from the CPU 3 to the DMA transfer request signal generation circuit 5.

Figure 4:
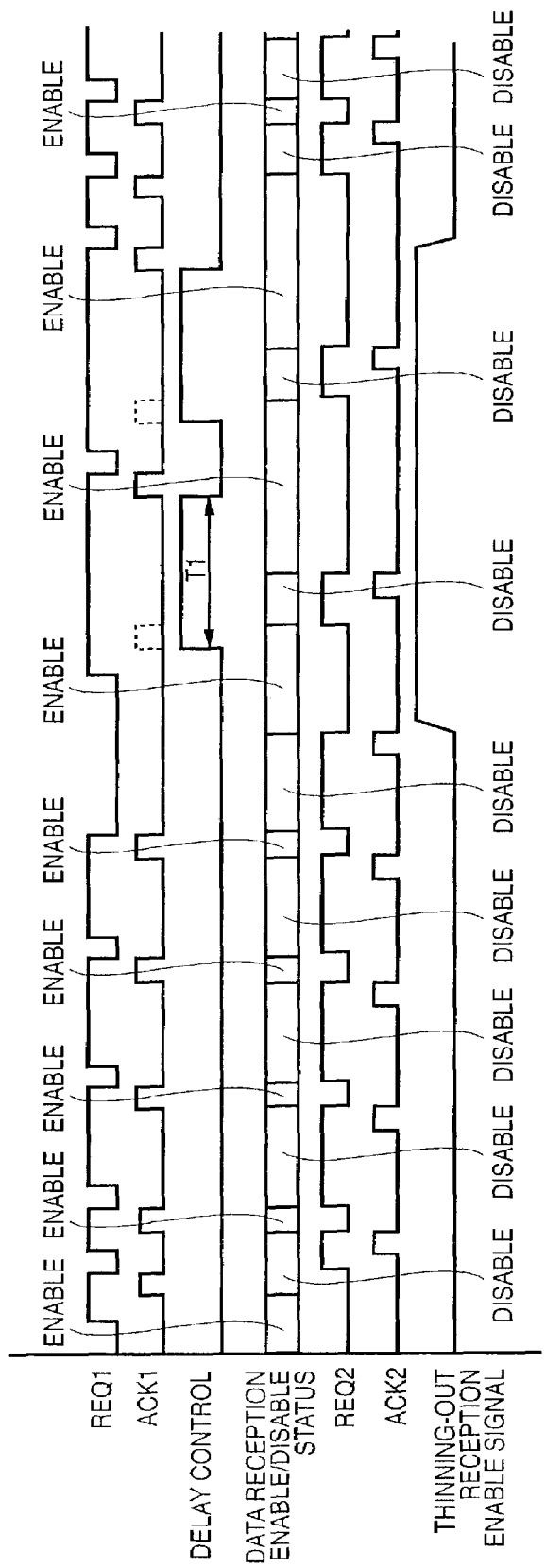
FIG. 4 is a timing chart showing the operations of the main signals in the printing system according to the first embodiment of the present invention.

If the thinning-out reception enable signal is enabled, the DMA transfer request signal generation circuit 5 performs delay control of delaying, by a predetermined time T1 (e.g., 10 msec) set in advance as shown in FIG. 4, the timing at which the signal ACK1 is sent back to the serial interface circuit 2.

Delay control delays the data reception timing from the serial interface circuit 2 to the DMA transfer request signal generation circuit 5. The delay inhibits the serial interface circuit 2 from receiving data from the host 100. The serial interface circuit 2 finally sends back a signal NACK to the host 100.

If the thinning-out reception enable signal is always effective, the signal NACK is always sent back to the host 100 after a predetermined time. For this reason, it is desirable to intermittently enable the thinning-out reception enable signal.

The detailed arrangement of the DMA request signal generation circuit 5 in FIG. 2 will be described with reference to FIG. 7.

Figure 7:
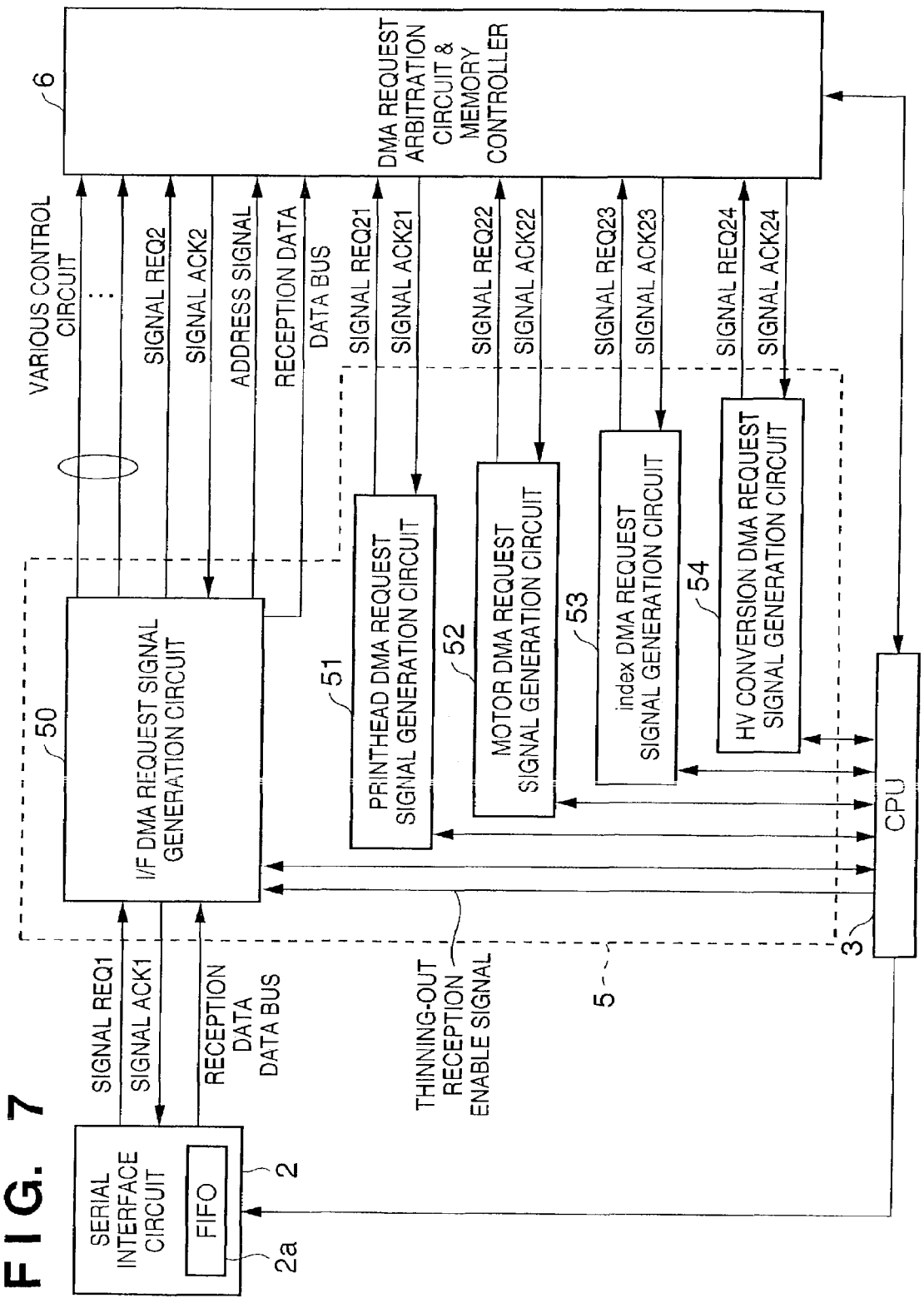
FIG. 7 is a block diagram showing the detailed arrangement of a DMA request signal generation circuit 5 according to the first embodiment of the present invention.

FIG. 7 is a block diagram showing the detailed arrangement of the DMA request signal generation circuit 5 according to the first embodiment of the present invention.

FIG. 7 shows the detailed arrangement of the DMA request signal generation circuit 5 and some peripheral circuits in the main arrangement of FIG. 2.

To operate the printing apparatus 1, the DMA request signal generation circuit 5 includes, e.g., an interface (I/F) DMA request signal generation circuit 50, a printhead DMA request signal generation circuit 51 for driving the printhead 104, a motor DMA request signal generation circuit 52 for driving various motors such as the carriage motor in the printing apparatus 1, an index DMA request signal generation circuit 53 for performing print data index processing (processing of converting print data from multilevel data (index data) into binary data), and an HV conversion DMA request signal generation circuit 54 for rearranging raster print data into column print data (HV conversion).

Each of the DMA request signal generation circuits 50 to 54 comprises a control block for controlling a building component to be processed. For example, the printhead DMA request signal generation circuit 51 has a control block for the printhead 104. This control block generates, e.g., a driving signal for the printhead 104. The motor DMA request signal generation circuit 52 has a control block for various motors such as the carriage motor. This control block generates driving signals for various motors such as the carriage motor.

If DMA processing becomes necessary, each DMA request signal generation circuit outputs a request signal for executing DMA. More specifically, the I/F DMA request signal generation circuit 50 outputs a signal REQ2. The printhead DMA request signal generation circuit 51 outputs a signal REQ21. The motor DMA request signal generation circuit 52 outputs a signal REQ22. The index DMA request signal generation circuit 53 outputs a signal REQ23. The HV conversion DMA request signal generation circuit 54 outputs a signal REQ24.

When the printing apparatus 1 receives print data from the host 100 and performs printing operation, the DMA request arbitration circuit & memory controller 6 receives DMA request signals (REQ2 to REQ24) from the respective DMA request signal generation circuits, and executes arbitration processing of these DMA request signals and memory access so as to efficiently perform control of the printhead 104, control of motors, print data rearrangement processing, and the like.

Note that the arbitration processing is executed on the basis of each of priorities assigned to the DMA request signals.

The I/F DMA request signal generation circuit 50 which has received a thinning-out reception enable signal delays the output timing of the signal REQ2 or signal ACK1, thereby delaying the print data reception timing from the host 100, as described above.

As the method of delaying the print data reception timing, the DMA request arbitration circuit & memory controller 6 can also be designed to delay only the signal ACK2. As the operation of the DMA request arbitration circuit & memory controller 6, a plurality of types of DMA request signals are received and arbitrated. If the DMA request arbitration circuit & memory controller 6 delays the print data reception timing in addition to this operation, the operation contents become more complicated. To prevent this, the print data reception timing is delayed by the above-described method in the first embodiment.

As described above, according to the first embodiment, a thinning-out reception enable signal is input to the DMA request signal generation circuit 5 in accordance with the state of the printer 1 before data from the host 100 cannot be received. The serial interface circuit 2 outputs a signal NACK to the host 100. Under this control, data can be received from the host 100 at a predetermined time or interval so as not to exceed the time-out time serving as a determination criterion for displaying a dialog. Display of any unnecessary error dialog on the host 100 can be prevented.

Second Embodiment

In the first embodiment, a thinning-out reception enable signal is generated on the basis of whether maintenance operation is occurred in the printing apparatus 1, thereby controlling the reception timing of data received from the host 100. However, the present invention is not limited to this. It is also possible to generate a thinning-out reception enable signal on the basis of, e.g., the free space of the reception buffer 4a in the printing apparatus 1 and control the data reception timing from the printing apparatus 1.

Figure 5:
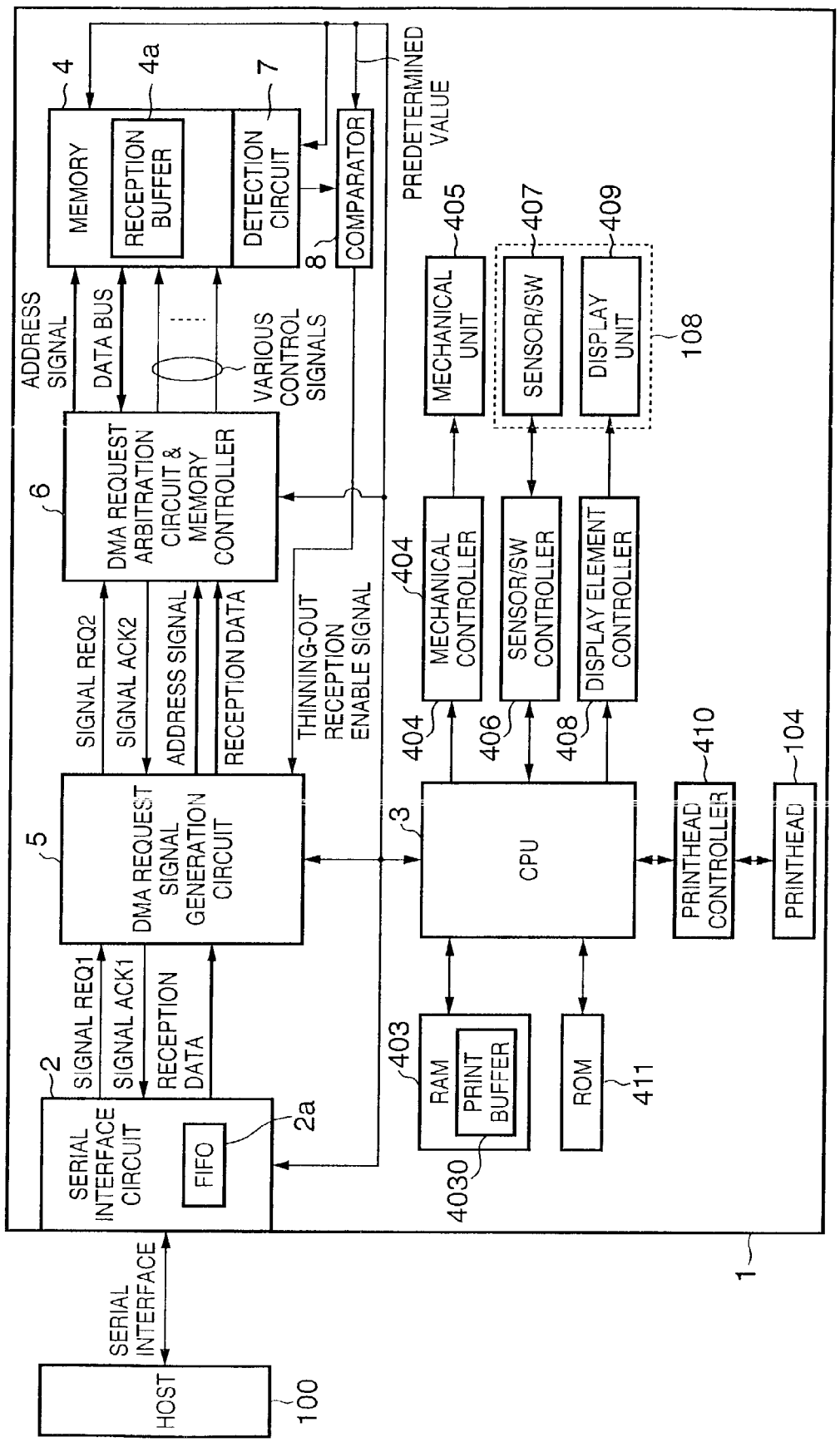
FIG. 5 is a block diagram showing the arrangement of a printing system according to the second embodiment of the present invention.

FIG. 5 is a block diagram showing the arrangement of a printing system according to the second embodiment of the present invention.

In FIG. 5, a detection circuit 7 which detects the free space of a reception buffer 4a in a memory 4, and a comparator 8 which compares the detected free space with a predetermined value are added to the arrangement of FIG. 2 in the first embodiment. The comparator 8 outputs a thinning-out reception enable signal to a DMA request signal generation circuit 5. A setting value is set in the comparator 8 by a CPU 3 in advance. The comparator 8 compares the detected free space with a predetermined value, and if the detected free space is smaller than the predetermined value as a result of comparison, outputs a thinning-out reception enable signal. Also in this case, the thinning-out reception enable signal is desirably intermittent.

In the second embodiment, the signal ACK1 is delayed upon generation of a thinning-out reception enable signal. The present invention is not limited to this, and, for example, the timing at which the signal REQ2 is enabled may be delayed.

As described above, according to the second embodiment, similar to the first embodiment, the data reception timing from a host 100 is controlled on the basis of the free space of the reception buffer 4a. Display of any unnecessary error dialog on the host 100 can be prevented while overflow of the reception buffer 4a is prevented.

In the first and second embodiments, the printing apparatus is an inkjet printing apparatus. However, the present invention is not limited to this. The present invention can be applied to a printing apparatus of any printing type such as laser beam type or thermal transfer type as far as the printing apparatus has an interface which generates a signal capable of delaying the data reception timing from the host (suppressing the data reception amount per unit time) on the basis of the state of the printing apparatus.

The data reception timing is controlled by intermittently transmitting to the host a control signal capable of controlling the data reception timing of the interface within a time shorter than the data transfer time-out time set by the host for the printing apparatus. While the host is controlled not to determine any time-out, data reception from the host can be continued at a preferable timing.

Processing executed by the printing apparatus 1 according to the first and second embodiments will be explained with reference to FIG. 6.

Figure 6:
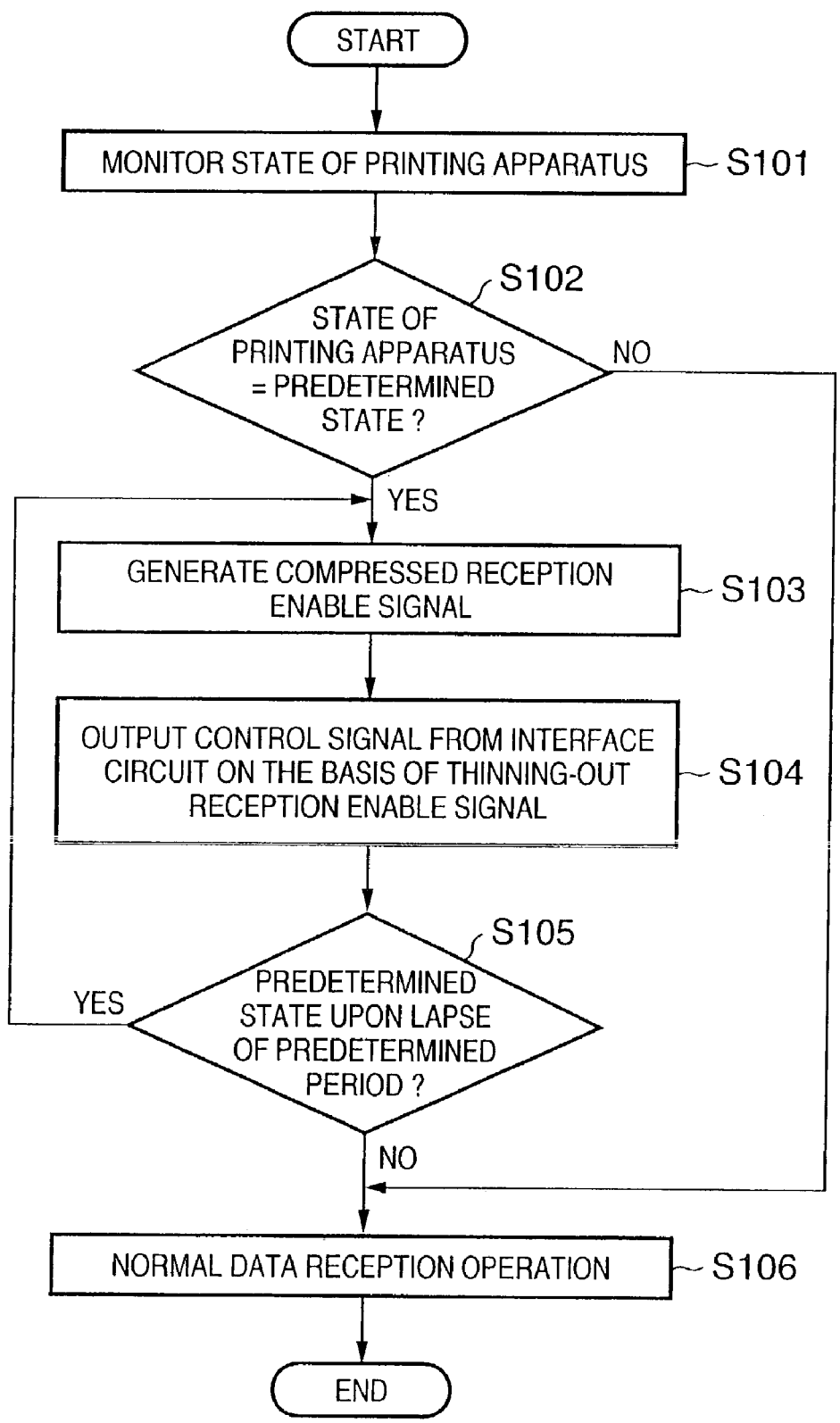
FIG. 6 is a flow chart showing processing executed by the printing apparatus according to the embodiments of the present invention.

FIG. 6 is a flow chart showing processing executed by the printing apparatus according to the embodiments of the present invention.

In step S101, the CPU 3 monitors the state of the printing apparatus 1. In step S102, whether the state of the printing apparatus 1 is a predetermined state is determined from the monitoring result. Note that the predetermined state is a state in which the host 100 may determine a time-out depending on data reception from the host 100 when, for example, maintenance operation is occurred or the free space of the reception buffer 4a is a predetermined value or less, as described above.

If the state of the printing apparatus is not the predetermined state in step S102 (NO in step S102), the processing advances to step S106 to execute normal data reception operation from the printing apparatus 1. If the state of the printing apparatus is the predetermined state (YES in step S102), the processing advances to step S103. The CPU 3 generates a thinning-out reception enable signal and outputs it to the DMA request signal generation circuit 5.

In step S104, output of the signal ACK1 from the DMA request signal generation circuit 5 is controlled on the basis of the thinning-out reception enable signal. The serial interface circuit 2 outputs a control signal (signal NACK) to the host 100.

In step S105, the CPU 3 determines whether the state of the printing apparatus 1 is the predetermined state even upon the lapse of a predetermined time. The predetermined time is set shorter than the time-out time of the host 100 for the above-described reason.

If the state of the printing apparatus 1 is the predetermined state in step S105 (YES in step S105), the processing returns to step S103. The CPU 3 generates a thinning-out reception enable signal again and inputs it to the DMA request signal generation circuit 5. If the state of the printing apparatus 1 is not the predetermined state (NO in step S105), the processing returns to step S106 to execute normal data reception operation from the host 100.

The present invention is also achieved by supplying a software program (in the above embodiments, programs corresponding to the flow chart shown in FIG. 6) for realizing the functions of the above-described embodiments to a system or apparatus directly or from a remote place, and reading out and executing the supplied program codes by the computer of the system or apparatus. In this case, the software need not be a program as far as it has a program function.

The present invention is therefore realized by program codes installed into the computer in order to realize functional processing of the present invention by the computer. That is, the present invention includes a computer program for realizing functional processing of the present invention.

In this case, the present invention can take any program form such as an object code, a program executed by an interpreter, or script data supplied to an OS as long as a program function is attained.

A recording medium for supplying the program includes a floppy® disk, hard disk, optical disk, magnetooptical disk, MO, CD-ROM, CD-R, CD-RW, magnetic tape, nonvolatile memory card, ROM, and DVD (DVD-ROM and DVD-R).

As another program supply method, the program can be supplied by connecting a client computer to an Internet homepage via the browser of the client computer, and downloading the computer program of the present invention or a thinning-out file containing an automatic installing function from the homepage to a recording medium such as a hard disk. The program can also be supplied by classifying program codes which constitute the program of the present invention into a plurality of files, and downloading the files from different homepages. That is, the present invention also contains a WWW server which allows a plurality of users to download the program files for realizing functional processing of the present invention by a computer.

The present invention can also be realized by the following method. That is, the program of the present invention is encrypted, stored in a storage medium such as a CD-ROM, and distributed to the user. A user who satisfies predetermined conditions is caused to download decryption key information from a homepage via the Internet. The user executes the encrypted program by using the key information, and installs the program in the computer.

The functions of the above-described embodiments are realized when the computer executes a readout program. Also, the functions of the above-described embodiments are realized when an OS or the like running on a computer performs part or all of actual processing on the basis of the instructions of the program codes.

The functions of the above-described embodiments are also realized when a program read out from a storage medium is written in the memory of a function expansion board inserted into a computer or the memory of a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus which performs printing on the basis of data received from a host, comprising:

interface means for receiving data from the host;

transfer means for responding to a data transfer request received from said interface means and DMA transferring data from said interface means to a reception buffer; and determination means for determining a state of the printing apparatus, and if it is determined that the state is a predetermined state, outputting a predetermined signal to said transfer means, wherein said transfer means delays a timing for outputting to said interface means a response corresponding to said data transfer request received from said interface means on the basis of said predetermined signal, wherein said interface means outputs a signal to said host on the basis of said response, and wherein said transfer means delays said timing with a time shorter than a data transfer time-out time when the host determines an error of the printing apparatus.

2. The apparatus according to claim 1, wherein said transfer means includes a DMA request signal generation circuit and a DMA request arbitration circuit which transfer data to the reception buffer by DMA transfer.

3. The apparatus according to claim 2, wherein the transfer timing of said transfer means is delayed by delaying an output time of a control signal output from the DMA request signal generation circuit.

4. The apparatus according to claim 2, wherein the DMA request arbitration circuit receives DMA request signals from a plurality of DMA request signal generation circuits, and executes arbitration processing of the received DMA request signals.

5. The apparatus according to claim 1, wherein said determination means determines as the state of the printing apparatus whether or not maintenance operation is occurred in the printing apparatus.

6. The apparatus according to claim 1, wherein said determination means determines as the state of the printing apparatus whether a free space of the reception buffer in the printing apparatus is not more than a predetermined value.

7. A method of controlling a printing apparatus which performs printing on the basis of data received from a host, comprising:

a transfer step of responding to a data transfer request received from an interface for receiving data from the host, and DMA transferring data from the interface to a reception buffer; and a determination step of determining a state of the printing apparatus, and if it is determined that the state is a predetermined state, outputting a predetermined signal to said transfer step, wherein said transfer step delays a timing for outputting to said interface a response corresponding to said data transfer request received from said interface on the basis of said predetermined signal, wherein said interface outputs a signal to said host on the basis of said response, and wherein said transfer step delays said timing with a time shorter than a data transfer time-out time when the host determines an error of the printing apparatus.

\* \* \* \* \*

UNITED STATES PATENT AND TRADEMARK OFFICE
CERTIFICATE OF CORRECTION

PATENT NO. : 7,359,077 B2
APPLICATION NO. : 10/420728
DATED : April 15, 2008
INVENTOR(S) : Kuronuma et al.

It is certified that error appears in the above-identified patent and that said Letters Patent is hereby corrected as shown below:

DRAWINGS:
Sheet 7, FIG. 7, "VARIOUS CONTROL CIRCUIT" should read -- VARIOUS CONTROL CIRCUITS --.

COLUMN 2:
Line 44, "is occurred" should read -- occur --.

COLUMN 6:
Line 33, "to" should be deleted; and
Line 34, "write" should read -- writing of --.

COLUMN 8:
Line 36, "is occurred" should read -- occurs --.

COLUMN 9:
Line 32, "is occurred" should read -- occurs --.

COLUMN 11:
Line 29, "is occurred" should read -- occurs --.

Signed and Sealed this

Twenty-first Day of October, 2008

JON W. DUDAS
*Director of the United States Patent and Trademark Office*